United States Patent
McBeath

(10) Patent No.: US 9,461,997 B2
(45) Date of Patent: Oct. 4, 2016

(54) SECURE AUTHORIZATION OF MODULES RUNNING ON VIRTUALIZED HARDWARE

(71) Applicant: Spirent Communications, Inc., Sunnyvale, CA (US)

(72) Inventor: Thomas R. McBeath, Calabasas, CA (US)

(73) Assignee: Spirent Communications, Inc., Sunnyvale, CA (US)

(*) Notice: Subject to any disclaimer, the term of this patent is extended or adjusted under 35 U.S.C. 154(b) by 0 days.

(21) Appl. No.: 14/473,760

(22) Filed: Aug. 29, 2014

(65) Prior Publication Data

US 2015/0074770 A1    Mar. 12, 2015

Related U.S. Application Data

(60) Provisional application No. 61/876,974, filed on Sep. 12, 2013.

(51) Int. Cl.
*H04L 29/00* (2006.01)
*H04L 29/06* (2006.01)
*H04L 12/26* (2006.01)
*G06F 21/44* (2013.01)
*G06F 9/455* (2006.01)
*G06F 21/60* (2013.01)

(52) U.S. Cl.
CPC ........... *H04L 63/0884* (2013.01); *G06F 9/455* (2013.01); *G06F 21/44* (2013.01); *G06F 21/606* (2013.01); *H04L 43/50* (2013.01); *G06F 2009/45587* (2013.01)

(58) Field of Classification Search
CPC combination set(s) only.
See application file for complete search history.

(56) References Cited

U.S. PATENT DOCUMENTS

| 8,264,972 | B2 | 9/2012 | Joyner | |
| 2010/0058053 | A1* | 3/2010 | Wood | G06F 21/31 713/155 |
| 2014/0109063 | A1* | 4/2014 | Schissel | G06F 11/368 717/127 |

* cited by examiner

*Primary Examiner* — Ghazal Shehni
(74) *Attorney, Agent, or Firm* — Haynes Beffel & Wolfeld LLP; Ernest J. Beffel, Jr.

(57) ABSTRACT

A method is described that includes securing authorization for a control module to conduct a test using a plurality of test modules running on a plurality of virtual machines. The method further includes registering the plurality of test modules with the control module to conduct the test. Authorization of the control module is extended to the test modules by securely communicating authorization and instructions to a first set of the registered test modules to send test stimulus to a device under test. Similarly, the authorization is extended to the test modules by securely communicating authorization to and receiving test result data from a second set of the registered test modules, wherein the test result data is responsive to the test stimulus sent to the device under test. The first and second sets of registered test modules can overlap or be the same test modules.

25 Claims, 2 Drawing Sheets

SECURE AUTHORIZATION OF MODULES RUNNING ON VIRTUALIZED HARDWARE

RELATED CASES

This application claims the benefit of U.S. Provisional Application No. 61/876,974 filed on Sep. 12, 2013, also entitled "Secure Authorization of Modules Running on Virtualized Hardware". This priority application is hereby incorporated by reference.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to implementations of the claimed inventions.

Load, stress or performance testing of an Internet device under test (DUT), such as a core router or server, involves emulating hundreds, thousands, or even millions of simultaneous sessions. The sessions may be directed to or through the device being tested.

Recent test architectures utilize multiple virtual machines running multiple or even numerous test modules. The virtual machines present the test modules with virtualized hardware interfaces that can be coupled in communication with the DUT.

Secure authorization of software running on virtual machines is more difficult than with real hardware. Authorization is even more difficult when multiple instances of modules are run on multiple virtual machines, especially when the virtual machines are instantiated for a particular test.

An opportunity arises to improve technologies that securely authorize operation of numerous modules in a virtualized environment.

SUMMARY

A method is described that includes securing authorization for a control module to conduct a test using a plurality of test modules running on a plurality of virtual machines. The method further includes registering the plurality of test modules with the control module to conduct the test. Authorization of the control module is extended to the test modules by securely communicating authorization and instructions to a first set of the registered test modules to send test stimulus to a device under test. Similarly, the authorization is extended to the test modules by securely communicating authorization to and receiving test result data from a second set of the registered test modules, wherein the test result data is responsive to the test stimulus sent to the device under test. The first and second sets of registered test modules can overlap or be the same test modules.

BRIEF DESCRIPTION OF THE DRAWINGS

The included drawings are for illustrative purposes and serve only to provide examples of possible structures and process operations for one or more implementations of this disclosure. These drawings in no way limit any changes in form and detail that may be made by one skilled in the art without departing from the spirit and scope of this disclosure. A more complete understanding of the subject matter may be derived by referring to the detailed description and claims when considered in conjunction with the following figures, wherein like reference numbers refer to similar elements throughout the figures.

DETAILED DESCRIPTION

Figure 1:
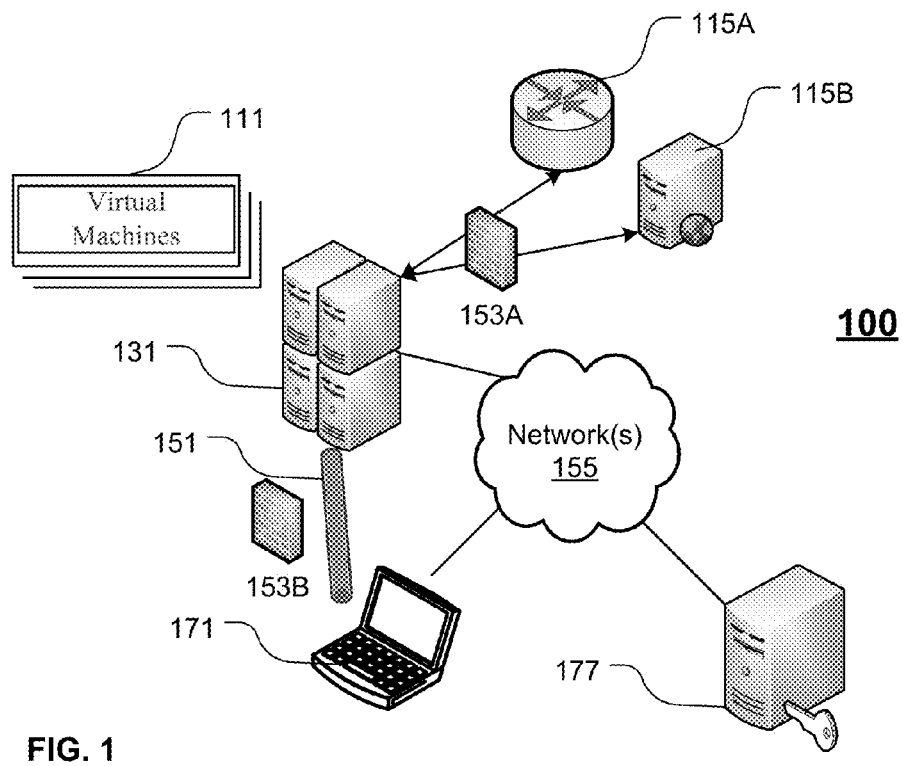
FIGS. 1-2 illustrate example environments in which this technology can be practiced.

The following detailed description is made with reference to the figures. Sample implementations are described to illustrate the technology disclosed, not to limit its scope, which is defined by the claims. Those of ordinary skill in the art will recognize a variety of equivalent variations on the description that follows.

Examples of systems, apparatus, and methods that practice to the technology disclosed are described in a "test" context. The examples of secure authorization of and control over test modules are being provided solely to add context and aid in the understanding of the disclosed implementations. In other instances, opportunities to apply the technology disclosed may include other types of parallel processing on numerous virtual machines or even on real machines. Other applications are possible, such that the following examples should not be taken as definitive of or limiting either in scope, context or setting. It will thus be apparent to one skilled in the art that implementations may be practiced in or outside the "test" context.

The technology disclosed can operate in a test environment with test modules running on virtual machines. The modules form an interface layer (IL) that interacts with the device under test. These modules communicate with a control module running on non-virtualized hardware. The control module includes business layer logic (BLL) that implements tests. A prior description of use of IL and BLL components to conduct tests can be found in U.S. Pat. No. 8,264,972, which is hereby incorporated by reference.

Prior test hardware configurations locked test modules of the interface layer to real hardware, including specially configured test hardware available from Spirent Communication. The control module did not need to be locked or securely authorized, because it interacted only with securely authorized test modules. Applicant recognized that secure authorization is much more difficult for modules when they run on virtual hardware, instead of real hardware.

The new technology disclosed securely authorizes the control module and relies on secure interaction between test modules and the control module to extend authorization from the control module to the test modules. The test modules only function when they are interacting with the securely authorized control module. The test modules need not be locked to the virtual machines on which they run.

We can require the control module to run on real hardware rather than a virtual machine. When the control module runs on an x86 processor, there are a number of ways of handling licensing and secure authorization. The control module can be required to communicate with a license server. This supports concurrent instance licensing and floating of test module licenses across a number of control modules. One can build a license server into the control module so it can only run a limited number of test modules on virtual machines. On initial contact with a previously unauthorized test module, the control module can identify it as a newly authorized test module and handle licensing for that module only, allowing a mix of new virtualized test modules, previously authorized virtualized test modules and old hardware-locked test modules in the same test.

The control module can use a light weight version of DES or AES with a shared key to encrypt the traffic and use of the x86 SSE instructions to accelerate encryption, with a modest added CPU demand. As an alternative to symmetrical key encryption, public-key encryption can be used.

Figure 2:
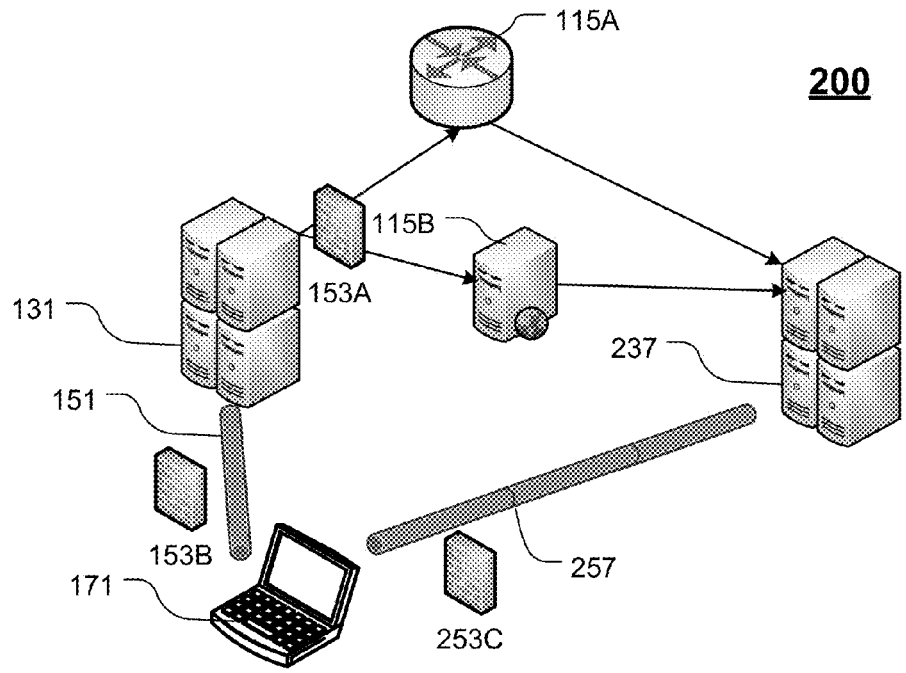

FIGS. 1-2 illustrate environments in which this technology can be practiced. FIG. 1 illustrates an environment 100 in which one or more modules running on the same virtual machine 111 generate test stimulus sent the device under test 115A-B and receive traffic from the device under test. One or more modules running on a single virtual machine generate the stimulus and analyze the response to produce test results.

The virtual machines 111 run on hardware 131. In turn, test modules run on the virtual machines. A network 155 interconnects components of the system. The control module running on hardware 171 is securely coupled in communication 151 with test modules running on the hardware 131 and virtual machines 111. This secure connection can be encrypted using symmetrical key encryption, such as DES or AES, or using public-key encryption.

In some environments, firewalls (e.g., 153A, 153B) can complicate creating a secure connection by closing secure transport ports such as HTTP port 443. Many corporate firewalls prohibit establishment of a VPN link from inside the firewall to an unknown destination. In restrictive firewall circumstances, communication between the control module running on hardware 171 and the test modules running on virtual machines 111 can be securely conducted over non-secure ports, such as HTTP port 80, by applying encryption at the application layer of the OSI layered model, instead of the transport or data layer. In this implementation, the control and test applications contain a component that encrypts and decrypts message payloads directly, instead of relying on the operating system or a transport security component to establish a secure link over a secure, encrypted port or VPN. In alternative implementations, secure communications can be established at a low layer of the OSI model or a high layer. The technology can be adaptive, switching between low layer and high layer security implementations, depending on the characteristics of firewalls traversed during the test. Or, the technology can be implemented at the higher layers to accommodate all firewalls. The technology can be implemented or at the lower layer with instructions on configuring firewalls to be compatible with the lower layer security implementation. Secure connection can be established in a variety of ways, not limited to using a secure port or VPN.

The control module and hardware 171 are securely authorized by an authorization server 177. A variety of devices can be tested in this fashion, such as core routers 115A and Web servers 115B. Other devices that can be tested include domain name servers, data servers, and edge cache servers. Test equipment is illustrated as being directly connected to the device under test in this figure, but it could be connected through network components 155. In FIG. 1, one set of virtual machines 111 both sends stimulus to and determines the result of testing of the devices under test.

The hardware 131 includes memory for storage of data and software applications, a processor for accessing data and executing applications, and components that facilitate communication over the network. In one implementation, the network 155 includes the Internet. The network 155 can also utilize dedicated or private communication links that are not necessarily part of Internet. In one implementation, the network 155 uses standard communication technologies, protocols, and/or inter-process communication technologies. The hardware 171 on which the control module executes, may be for example a desktop computer, laptop, tablet computer or any other type of computing device.

FIG. 2 illustrates a slightly different environment in which test stimulus sent to the device under test are generated on one set of virtual machines and traffic from the device under test is received by a second set of virtual machines. Data received is correlated with test stimulus to produce test result data. Some of the components have been removed from illustration in FIG. 2 for the sake of clarity. The second set of test modules running on virtual machines 237 is illustrated as having a secure connection 257 with the control module running on hardware 171. In this arrangement, test stimulus is sent from the left side 131 of the figure through the devices under test 115A-B to the second set of test modules running on virtual machines and hardware 237 on the right side of the figure.

In both FIGS. 1-2, a plurality of test modules operate as an interface layer and interact with the control module. The test modules operate on virtual machines which are instantiated and run on real hardware. This hardware provides virtual machines access to real communication ports that can be coupled with the device under test. In the figures, the control module operates on real hardware, which supports a variety of known methods of secure authorization. For instance, secure authorization can be tied to the MAC address, processor ID, or a combination of hardware features of the hardware 171 that runs the control module.

The control module exchanges signals or messages with the test modules. These signals are securely encrypted. Either symmetrical key or public-key encryption can be used. The test modules only respond to instructions received on the securely encrypted channel. Encryption keys may be built into the test modules, obtained by the test modules from the control module, or obtained from a master key server. The keys may be perpetual, good for a limited number of uses, good until an expiration date, or good until revoked.

During operation, the control module enumerates test modules that it controls. The secure authorization of the control module may limit the number of test modules used at one time on one test. The control module instructs the test modules regarding their tasks. This extends authorization from the control module to the test modules. The test modules trust that they are authorized to operate as instructed by a securely authorized control module.

Figure 3:
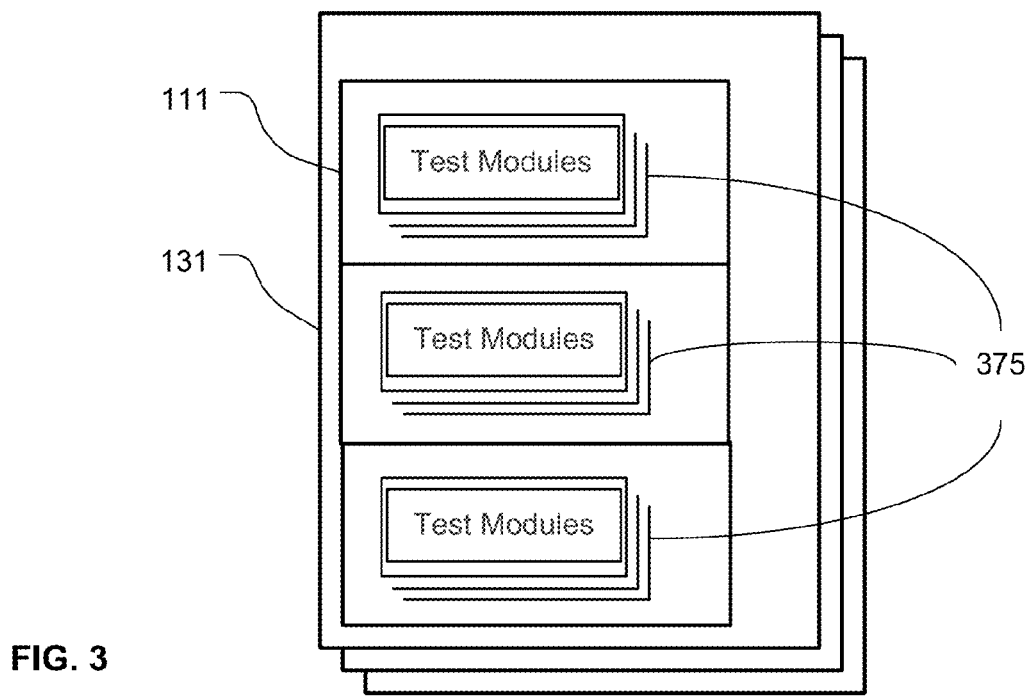
FIG. 3 illustrates test modules running on virtual machines that, in turn, run on hardware.

FIG. 3 is a block diagram that illustrates test modules 375 running on virtual machines 111 that, in turn, run on hardware 131. A plurality of test modules are illustrated is running on one virtual machine. Various implementations may have different and/or additional modules than those shown in the figure. Moreover, the functionalities can be distributed among modules in a different manner than illustrated by the figure. In some implementations, a single test module runs on a virtual machine. In some implementations, a single virtual machine runs on a real machine.

In some implementations, the test module includes a registration component that cooperates with a registration component of the control module to register the test module. The registration may be effective for a single test or for a particular control module. The test modules also can include a secure communication component that interacts with a complementary secure communication component of the control module. Secure communications are encrypted. Encryption, as described above, can use symmetrical key or public-key algorithms. The test modules further can include an authorization verification component that does not allow the test modules to operate unless it verifies that instructions given by the control module are authorized. Because the instructions are carried by a securely encrypted channel 151, 257, content of a decrypted instruction stream can be analyzed to verify authorize operation, for instance, by matching a particular string or token.

The test module can receive the instructions to the authorization verification component directly from the control module without opening as separate link or channel to a distinct authorization server. The connection between the test and control modules is part of running a test, so the test module can rely on the control module both for instructions and authorization. This can be an advantage in secure networks that scrutinize the behavior of and connections made by a component such as a test module.

Figure 4:
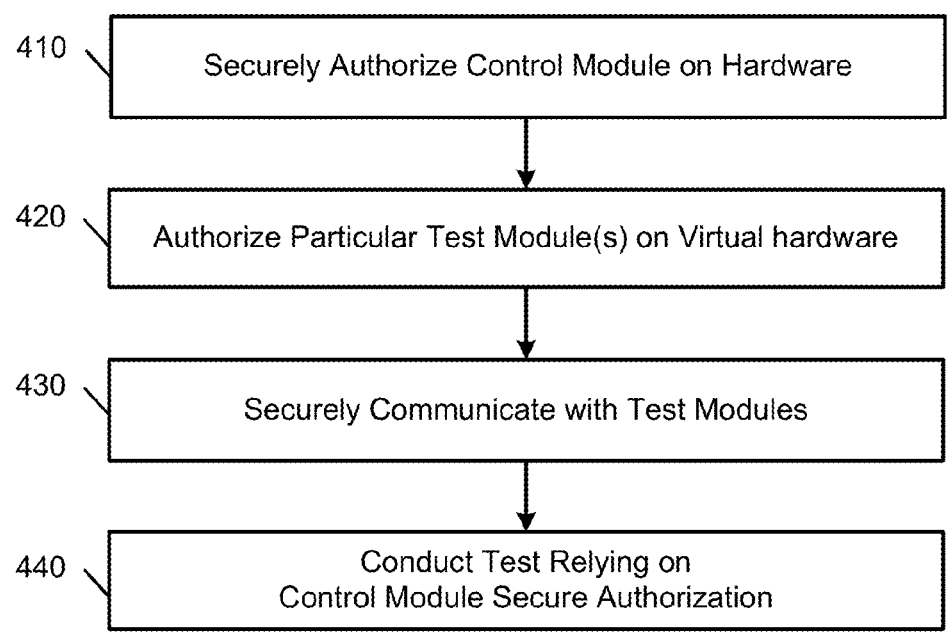
FIG. 4 is a high level flow chart described from the perspective of the control module.

FIG. 4 is a high level flow chart described from the perspective of the control module. Complementary flow-charts could be composed from the perspectives of the test modules or the authorization server. Other implementations may perform the steps in different orders and/or perform different or additional steps in the ones illustrated in the figure. For convenience, this figure will be described with reference to the system of one or more computers that perform the process. The system can be, for example, as illustrated in FIGS. 1-2.

In this figure, the first action 410 is to securely authorize the control module on particular hardware. This secure authorization can be extended to test modules.

Action 420 is to authorize particular test modules to conduct one or more test on virtual hardware. This may include registration the test modules. It may involve assigning keys to the test modules or to virtual machines on which the test modules run.

Action 430 is to securely communicate between the control module and the test modules. This communications includes instructions regarding conducting a test and collection of test result data. Different test modules may be involved in generating test stimulus than in returning test result data.

Action 440 is to conduct the test in which the test modules rely on secure authorization of the control module. In effect, secure authorization the control module is extended to individual test modules during the test.

While the process illustrated is described for ease of understanding by reference to the systems in the figures, it should be understood that the process is computer implemented but does not depend on any particular system.

Particular Implementations

In one implementation, a method is described that includes securing authorization for a control module to conduct a test using a plurality of test modules running on a plurality of virtual machines. The method further includes registering the plurality of test modules with the control module to conduct the test. Authorization of the control module is extended to the test modules by securely communicating authorization and instructions to a first set of the registered test modules to send test stimulus to a device under test. Similarly, the authorization is extended to the test modules by securely communicating authorization to and receiving test result data from a second set of the registered test modules, wherein the test result data is responsive to the test stimulus sent to the device under test.

This method and other implementations the technology disclosed can each optionally include one or more the following features.

In some implementations, the authorization of the control module to conduct the test is by communication with a server operated by or for a test vendor. In these implementations, the test vendor can be a publisher/seller of the control module and/or test modules.

The secure authorization of the control module can be responsive at least in part to sending identifying characteristics of hardware on which the control module is running to an authorization server.

The secure authorization of the control module can be verified by communication with an authorization server responsive to the control module receiving a user instruction to run the test, as a prerequisite to proceeding to run the test as instructed.

Securely communicating authorization and instructions to the first set of registered test modules can include application layer encryption of message payloads, which does not require use of a secure communication port. In this sense, application layer refers to an application related function, in lieu of relying on operating system level (data or transport layer) implementations of secure port protocols. Alternatively, securely communicating authorization and instructions to the first set of registered test modules can be implemented using lower layer communication protocols, including protocols implemented by an operating system or an OS kernel add-in. Standard VPN secure communication protocols are in this category of lower layer communication protocols.

The test modules are configured to not run a test unless they receive securely communicated authorization and instructions from the control module.

The test modules will not return test result data unless they receive securely communicated authorization and instructions from the control module. Communication can be secured by encrypting or signing a message.

The secure authorization of the control module can include a limit on how many of the test modules can be used to conduct the test and the control module enforces the limit.

Other implementations may include a non-transitory computer readable storage medium storing instructions executable by a processor to perform a method as described. Yet another implementation may include a system with memory and one or more processors that execute instructions, stored in memory, to perform a method as described.

In another implementation, a system is described that includes a control module running on hardware and communicating with an authorization server. A registration component of the control module registers test modules running on virtual machines to conduct a test authorized by the control module. A plurality of test modules run on a plurality of virtual machines, linked in communication with the control module.

The system further includes complementary secure communication components of the control module and the test modules that cooperatively establish a secure communication channel over which the control module and the test modules exchange authorization and instructions to send test stimulus to a device under test and to produce test result data responsive to the test stimulus sent to the device under test. Key to the test modules of the system further include an authorization verification component that verifies the authorization and the instructions given by the control module to registered test modules to conduct the test.

This system and other implementations the technology disclosed can each optionally include one or more features that implement the methods describe above and as described as system components.

The system can further include an authorization server, coupled in communication with the control module, and a master authorization verification component of the control module that verifies and stores authorization given by the authorization server to the control module to conduct the test. The control module can be configured to send hardware characteristic data to the authorization server in order to obtain secure authorization.

The test modules can be configured not to run unless they receive securely communicated authorization and instructions from the control module. Similarly they can be configured not to return test result data except under secure control of the control module.

The control module can further be configured to verify its continuing authorization with the authorization server responsive to receiving a user instruction to run a test, before actually running the requested test.

Other implementations may include a non-transitory computer readable storage medium storing instructions executable by a processor that, when combined with appropriate hardware, produces the system described above.

While the present invention is disclosed by reference to the preferred implementations and examples detailed above, it is to be understood that these examples are intended in an illustrative rather than in a limiting sense. It is contemplated that modifications and combinations will readily occur to those skilled in the art, which modifications and combinations will be within the spirit of the invention and the scope of the following claims.

The invention claimed is:

1. A method including:
securing authorization from a test vendor for a control module to conduct a test using test modules running on a plurality of virtual machines;
registering the test modules with the control module to conduct the test;
extending authorization of the control module to the test modules by securely communicating authorization and instructions to a first set of the registered test modules to send test stimulus to a device under test; and
extending authorization of the control module to the test modules by securely communicating authorization to and receiving test result data from a second set of the registered test modules, wherein the test result data is responsive to the test stimulus sent to the device under test.

2. The method of claim 1, wherein the secure authorization by the test vendor of the control module is responsive at least in part to sending identifying characteristics of hardware on which the control module is running to an authorization server.

3. The method of claim 1, wherein the secure authorization by the test vendor of the control module is verified in communications with an authorization server responsive to the control module receiving a user instruction to run the test, as a prerequisite to proceeding to run the test as instructed.

4. The method of claim 1, wherein securely communicating authorization and instructions to the first set of registered test modules includes application layer encryption of message payloads, without reliance on secure communication ports.

5. The method of claim 1, wherein the test modules will not run a test unless they receive securely communicated authorization and instructions from the control module.

6. The method of claim 1, wherein the test modules will not return test result data unless they receive securely communicated authorization and instructions from the control module.

7. The method of claim 1, wherein the secure authorization of the control module includes a limit on how many of the test modules can be used to conduct the test and the control module enforces the limit.

8. The method of claim 1, wherein the first set of test modules and the second set of test modules are running on different sets of virtual machines.

9. A system including:
a hardware processor and memory coupled to the hardware processor;
a control module running on the hardware processor and communicating with a test authorization server;
a registration component of the control module that registers test modules running on virtual machines to conduct a test authorized by the control module;
test modules running on a plurality of virtual machines, linked in communication with the control module;
complementary secure communication components of the control module and the test modules that cooperatively establish a secure communication channel, wherein the secure communication components are configured to exchange authorization and instructions to
send test stimulus to a device under test and
produce test result data responsive to the test stimulus sent to the device under test; and
an authorization verification component of each of the test modules that verifies the authorization and the instructions given by the control module to registered test modules to send the test stimulus and produce the test result data.

10. The system of claim 9, further including the test authorization server, coupled in communication with the control module, and a master authorization verification component of the control module that verifies and stores authorization given by the test authorization server to the control module to conduct the test.

11. The system of claim 10, wherein the control module is configured to send identifying characteristics of hardware on which the control module is running to the test authorization server.

12. The system of claim 10, wherein the master authorization verification component is configured to enforce a limit on how many of the test modules can be used to conduct the test.

13. The system of claim 9, wherein the control module is configured to secure authorization by the test authorization server, as a prerequisite to proceeding to run the test as instructed, responsive to the control module receiving a user instruction to run the test.

14. The system of claim 9, wherein the secure communication components are configured to include application layer encryption/decryption of message payloads, without reliance on secure communication ports.

15. The system of claim 9, wherein the test modules are configure not to run a test unless they receive securely communicated authorization and instructions from the control module.

16. The system of claim 9, wherein the test modules are configure not to return test result data unless they receive securely communicated authorization and instructions from the control module.

17. The system of claim 9, wherein the test modules include first and second test modules deployed to run on different sets of virtual machines, the first test modules configured to send the test stimulus and the second test modules configured to produce the test result data.

18. A non-transitory computer readable medium impressed with instructions that, when executed on hardware, cause the hardware to:
   secure authorization from a test vendor for a control module to conduct a test using test modules running on a plurality of virtual machines;
   register the plurality of test modules with the control module to conduct the test;
   extend authorization of the control module to the test modules by securely communicating authorization and instructions to a first set of the registered test modules to send test stimulus to a device under test; and
   extend authorization of the control module to the test modules by securely communicating authorization to and receiving test result data from a second set of the registered test modules, wherein the test result data is responsive to the test stimulus sent to the device under test.

19. The non-transitory computer readable medium of claim 18, wherein the secure authorization by the test vendor of the control module is responsive at least in part to sending identifying characteristics of hardware on which the control module is running to an authorization server.

20. The non-transitory computer readable medium of claim 18, wherein the secure authorization by the test vendor of the control module is verified in communications with an authorization server responsive to the control module receiving a user instruction to run the test, as a prerequisite to proceeding to run the test as instructed.

21. The non-transitory computer readable medium of claim 18, wherein securely communicating authorization and instructions to the first set of registered test modules includes application layer encryption of message payloads, without reliance on secure communication ports.

22. The non-transitory computer readable medium of claim 18, wherein the test modules will not run a test unless they receive securely communicated authorization and instructions from the control module.

23. The non-transitory computer readable medium of claim 18, wherein the test modules will not return test result data unless they receive securely communicated authorization and instructions from the control module.

24. The non-transitory computer readable medium of claim 18, wherein the secure authorization of the control module includes a limit on how many of the test modules can be used to conduct the test and the control module enforces the limit.

25. The non-transitory computer readable medium of claim 18, wherein the instructions further cause the hardware to extend authorization to the first set of test modules and the second set of test modules running on different sets of virtual machines.

* * * * *